(12) United States Patent
Tian

(10) Patent No.: US 11,862,897 B2
(45) Date of Patent: Jan. 2, 2024

(54) CONNECTOR FOR AN AIRCRAFT

(71) Applicant: Autoflight (Kunshan) Co., Ltd., Kunshan (CN)

(72) Inventor: Yu Tian, Hong Kong (CN)

(73) Assignee: AUTOFLIGHT (KUNSHAN) CO., LTD., Jiangsu Province (CN)

( * ) Notice: Subject to any disclaimer, the term of this patent is extended or adjusted under 35 U.S.C. 154(b) by 0 days.

(21) Appl. No.: 18/060,961

(22) Filed: Dec. 1, 2022

(65) Prior Publication Data

US 2023/0216246 A1    Jul. 6, 2023

(30) Foreign Application Priority Data

Dec. 1, 2021  (CN) .......................... 202123003431.8

(51) Int. Cl.
*H01R 13/645* (2006.01)
*H01R 103/00* (2006.01)

(52) U.S. Cl.
CPC ....... *H01R 13/645* (2013.01); *H01R 2103/00* (2013.01); *H01R 2201/26* (2013.01)

(58) Field of Classification Search
CPC ............. H01R 13/514; H01R 13/6271; H01R 13/6315; H01R 13/64; H01R 13/645; H01R 2103/00; H01R 2201/26
See application file for complete search history.

(56) References Cited

U.S. PATENT DOCUMENTS

| | | | | |
|---|---|---|---|---|
| 3,656,086 A * | 4/1972 | Debaigt | ............... | H01R 13/514 439/518 |
| 3,794,957 A * | 2/1974 | Winkler | ................. | H01R 13/28 439/679 |
| 4,403,824 A * | 9/1983 | Scott | ...................... | H01R 13/64 439/680 |
| 4,655,527 A * | 4/1987 | Vandame | ........... | H01R 13/6272 439/350 |
| 4,759,730 A * | 7/1988 | Sappington | .......... | H01H 85/201 337/213 |
| 4,820,180 A * | 4/1989 | Mosquera | .......... | H01R 13/6315 248/27.3 |
| 4,979,910 A * | 12/1990 | Revil | ................. | H01R 13/6272 439/680 |
| 4,990,099 A * | 2/1991 | Marin | .................. | H01R 13/642 439/221 |
| 5,173,063 A * | 12/1992 | Barkus | ............... | H01R 13/6453 439/633 |
| 5,391,090 A * | 2/1995 | Power | ................ | H01R 13/6272 439/353 |

(Continued)

*Primary Examiner* — Thanh Tam T Le
(74) *Attorney, Agent, or Firm* — WPAT LAW, P.C.; Anthony King

(57) ABSTRACT

An aircraft and its connector where the connector has a first pluggable unit and a second pluggable unit, the end of the first pluggable unit is provided with several terminal pins, the end of the second pluggable unit is provided with several terminal sockets, and the terminal pin and the terminal socket can be operatively connected in a corresponding manner. The end of the first pluggable unit and the end of the second pluggable unit are also provided with an error-proof protrusion part and an error-proof concave part respectively. The error-proof protrusion part and the error-proof concave part are operatively connected in a corresponding manner.

16 Claims, 3 Drawing Sheets

(56) References Cited

U.S. PATENT DOCUMENTS

| | | | | |
|---|---|---|---|---|
| 5,439,387 | A * | 8/1995 | Hayashi | H01R 13/627 439/345 |
| 5,885,088 | A * | 3/1999 | Brennan | H01R 13/64 439/378 |
| 6,364,718 | B1 * | 4/2002 | Polgar | H01R 13/64 439/680 |
| 6,383,032 | B1 * | 5/2002 | Gerberding | H01R 13/645 439/681 |
| 6,561,832 | B2 * | 5/2003 | Geltsch | H01R 13/6275 439/353 |
| 6,790,067 | B2 * | 9/2004 | Douty | H01R 13/44 439/682 |
| 7,108,534 | B2 * | 9/2006 | Fabian | H01R 24/84 439/295 |
| 7,972,164 | B2 * | 7/2011 | Bucher | H01R 13/6272 439/354 |
| 8,192,212 | B2 * | 6/2012 | Casses | H01R 13/6272 439/181 |
| 8,545,275 | B2 * | 10/2013 | Wang | H01R 24/22 439/732 |
| 9,172,187 | B2 * | 10/2015 | Miyakawa | H01R 13/7193 |
| 9,246,281 | B1 * | 1/2016 | Edmunds | H01R 13/64 |
| 10,038,270 | B2 * | 7/2018 | Fabre | H01R 13/645 |
| 10,177,480 | B2 * | 1/2019 | Choi | H01R 13/6275 |
| 10,290,967 | B2 * | 5/2019 | Morral Marti | H01R 13/4534 |
| 10,722,123 | B2 * | 7/2020 | Liu | A61B 5/0507 |
| 10,985,500 | B2 * | 4/2021 | Grandcoing | H01R 13/641 |
| 11,146,017 | B2 * | 10/2021 | Shimizu | H01R 13/645 |

* cited by examiner

CONNECTOR FOR AN AIRCRAFT

CROSS-REFERENCES

This application claims priority to China Pat. Application No. 202123003431.8 filed on Dec. 1, 2021, which is hereby incorporated by reference in its entirety.

Although incorporated by reference in its entirety, no arguments or disclaimers made in the parent application apply to this divisional application. Any disclaimer that may have occurred during the prosecution of the above-referenced application(s) is hereby expressly rescinded. Consequently, the Patent Office is asked to review the new set of claims in view of all of the prior art of record and any search that the Office deems appropriate.

FIELD OF THE DISCLOSURE

The present disclosure relates to an aircraft component, in particular to an aircraft and its connector.

BACKGROUND OF THE INVENTION

Generally in the battery system of the current aircraft, multiple power batteries are connected by means of series plug-in connection. However, the current high-power connector does not have the function of error proofing. It can only be distinguished by means of an external marker. Sometimes, the insertion error occurs, because the battery generates large power, once the insertion error occurs, the consequences are unimaginable. In addition, different levels of aircraft have different battery power levels. If the batteries that do not correspond to each other are connected in series, the system requirements are often not met or even the system risk may result. For this reason, different connectors need to be designed and matched for different levels of aircraft, which is time-consuming, laborious and costly.

SUMMARY OF THE INVENTION

The purpose of the some of the embodiments is to provide an aircraft and its connector. The connector of the invention can change the error-proof head of the connector according to different products to achieve error proofing of the connector of more products, and therefore reduce the cost.

For this purpose, the first aspect of the invention provides a connector, which comprises: a first pluggable unit and a second pluggable unit; the end of the first pluggable unit is provided with several terminal pins; the end of the second pluggable unit is provided with several terminal sockets, and the terminal pins and the terminal sockets can be operatively connected in a corresponding manner; the end of the first pluggable unit and the end of the second pluggable unit are also respectively provided with an error-proof protrusion part and an error-proof concave part, the error-proof protrusion part and the error-proof concave part are operatively connected in a corresponding manner, the end of the first pluggable unit is provided with a first pluggable unit groove, the error-proof protrusion part is detachably set in the first pluggable unit groove, and the end of the second pluggable unit is provided with a second pluggable unit groove, the error-proof concave part is detachably set in the second pluggable unit groove.

The second aspect of the disclosed embodiments provides an aircraft, including the described connectors above.

Moreover, the error-proof protrusion part can be a uniaxially symmetrical outline on the plane intersecting with the direction of insertion.

Moreover, the first pluggable unit groove and the second pluggable unit groove can be equilateral polygons on the plane intersecting with the insertion direction, and the error-proof protrusion part and the error-proof concave part can be configured to be selectively inserted into the first pluggable unit groove and the second pluggable unit groove according to the angle of the equilateral polygons.

Moreover, the end of the first pluggable unit can be provided with a number of first through-holes, each of the first through-holes can be provided with the terminal pin, the end of the second pluggable unit can be provided with a number of second through-holes, each of the second through-holes can be provided with the terminal socket, and the terminal pin in the first through-holes and the terminal socket in the second through-holes can be operatively connected in a corresponding manner.

Moreover, the error-proof concave part comprises an inner wall and an outer wall; on the plane intersecting with the insertion direction, the outer wall has the same outline as the second pluggable unit groove, and the inner wall has the same outline as the outer wall of the error-proof protrusion part.

Moreover, the first pluggable unit groove and the second pluggable unit groove can be equilateral pentagons on the plane intersecting with the insertion direction.

Moreover, the first pluggable unit comprises a plug upper housing and a plug lower housing, and the second pluggable unit comprises a socket upper housing and a socket lower housing. The plug upper housing and the plug lower housing can be detachably connected with each other, the socket upper housing and the socket lower housing can be detachably connected, the terminal pin can be set between the plug upper housing and the plug lower housing, and the terminal socket can be set between the socket upper housing and the socket lower housing.

Moreover, the first pluggable unit and the second pluggable unit can be asymmetric with respect to the insertion direction.

Moreover, the outlines of the first through-holes on the plane intersecting with the insertion direction can be different, and the outlines of the second through-holes on the plane intersecting with the insertion direction can be different.

Compared with the prior art, the implementation mode of the invention can change the error-proof head of the connector for different products to achieve error proofing of more products, and reduce the cost.

Although features may be described above and below as acting in certain combinations and even initially claimed as such, one or more features from a claimed combination can in some cases be excised from the combination, and the claimed combination may be directed to a subcombination or variation of a subcombination.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION

Figure 1:
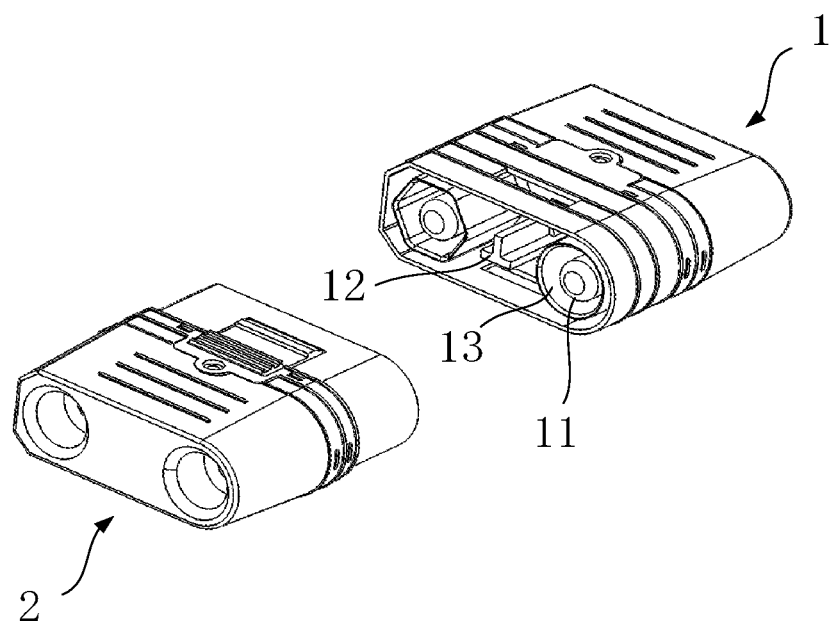
FIG. 1 shows the combination structure diagram of the first pluggable unit and the second pluggable unit of the connector provided by the embodiment of the present invention.

The following describes the implementation mode of the disclosure through specific embodiments, and those skilled in the art can easily understand the other advantages and effects of the invention from the contents disclosed in the description. The disclosure can also be implemented or applied by different embodiments, and various details in the specification can also be modified or changed based on different views and application systems without departing from the purpose of the invention. It should be noted that the embodiments and features in the embodiments in the invention can be combined with each other in case of no conflict.

The following is a detailed description of the embodiments of the invention with reference to the drawings, so that those skilled in the art to which the invention belongs can easily implement it. The invention can be embodied in a variety of different forms, and is not limited to the embodiments described herein.

In order to clearly explain the embodiments, devices irrelevant to the description are omitted, and the same reference symbols are assigned to the same or similar constituent elements in the entire specification.

In the entire specification, when a device is described to be "connected" with another device, it includes not only the case of "direct connection", but also the case of "indirect connection" where other components are placed between them. In addition, when a device "includes" certain constituent elements, as long as there is no record to the contrary, it does not exclude other constituent elements, it means that it can also include other constituent elements.

When a device is described to be "above" another device, it can be directly on the other device, but it can also be accompanied by other devices in between. In contrast, when a device is "directly" on another device, it is not accompanied by other devices in between.

Although the terms "first", "second", and such words are used herein to describe various elements in some examples, these elements should not be limited by these terms. These terms are used only to distinguish one element from another. For example, the first interface and the second interface etc. Furthermore, as used herein, the singular forms "one", "a" and "the" are intended to include the plural, unless the context indicates otherwise. It should be further understood that the terms "comprise" and "include" indicate the existence of the described features, steps, operations, elements, components, items, categories, and/or groups, but do not exclude the existence, presence, or addition of one or more other features, steps, operations, elements, components, items, categories, and/or groups. The terms "or" and "and/or" as used herein are interpreted to be inclusive or to mean any one or any combination thereof. Therefore, "A, B or C" or "A, B and/or C" means "any of the following: A; B; C; A and B; A and C; B and C; A, B and C". Exceptions to this definition occur only when combinations of components, functions, steps, or operations are inherently mutually exclusive in some ways.

The technical terms used herein are only used to refer to specific embodiments and are not intended to limit the invention. The singular form used here also includes the plural form, as long as the statement does not clearly express the opposite meaning. The meaning of "including" used in the specification is to specify the unique characteristics, regions, integers, steps, operations, elements and/or components, not to exclude the existence or addition of other characteristics, regions, integers, steps, operations, elements and/or components.

The terms "under", "over" and other relative spaces term may be used in order to illustrate more easily the direction relationship of one device to another illustrated in the drawings. The terms are, not only in the sense referred to in the drawings, but also in other senses or operations of the device in use. For example, if the device in the drawings is turned over, a device that was illustrated as being "under" another device is illustrated as being "over" another device. Thus, the exemplary term "under" includes both above and below. Devices can be rotated by 90° or other angles and the terms representing relative space are interpreted accordingly.

Although it is not defined differently, all terms, including technical terms and scientific terms used herein, have the same meaning as is generally understood by those skilled in the art to which the present invention belongs. Terms defined in commonly used dictionaries are additionally interpreted as having a meaning consistent with the content of the relevant technical literature and current understanding, and can't be over-interpreted in a desirable or very formulaic sense, provided that they are not defined.

Figure 2:
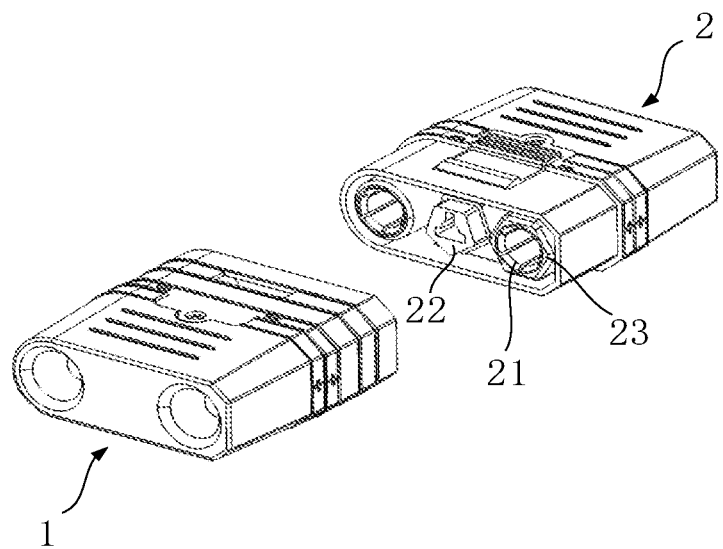
FIG. 2 shows another combination structure diagram of the first pluggable unit and the second pluggable unit of the connector provided by the embodiment of the present invention.
Figure 4:
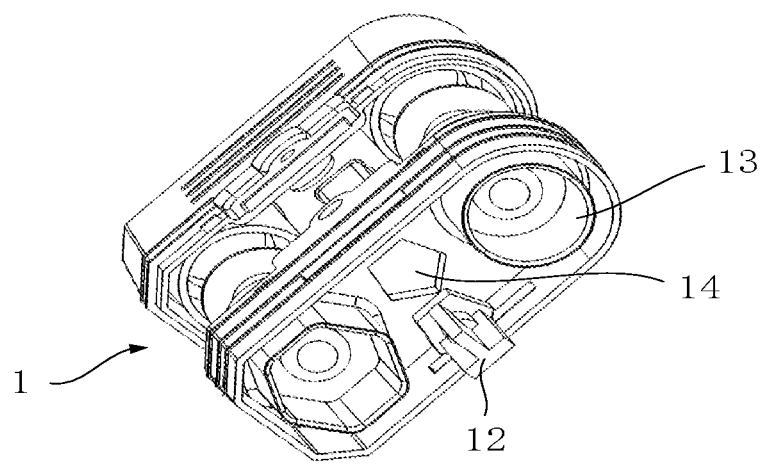
FIG. 4 shows an exploded structure diagram of the first pluggable unit of the connector provided by the embodiment of the present invention.
Figure 5:
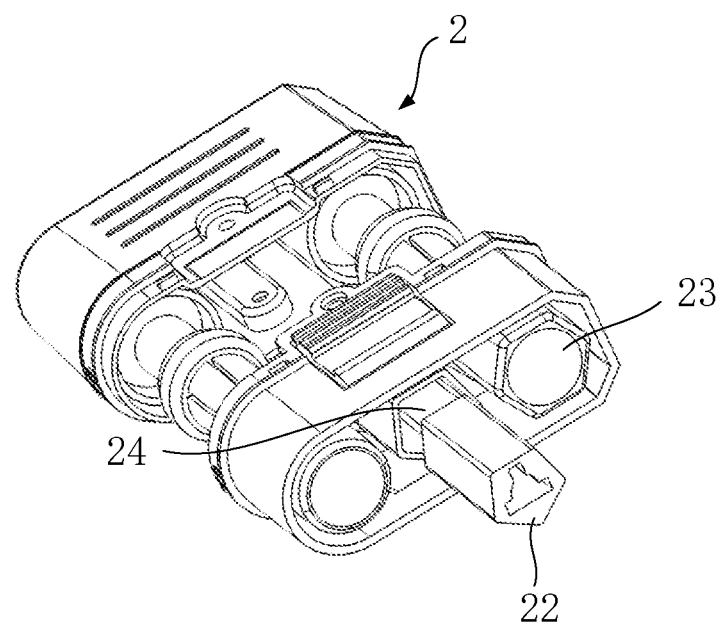
FIG. 5 shows an exploded structure diagram of the second pluggable unit of the connector provided by the embodiment of the present invention.

The first embodiment of the invention is described below with reference to the drawings. As shown in FIGS. 1 and 2, the connector of the invention comprises the first pluggable unit 1 and the second pluggable unit 2; the end of the first pluggable unit 1 is provided with two terminal pins 11, the end of the second pluggable unit 2 is provided with two terminal sockets 21, the end of the first pluggable unit 1 is also provided with an error-proof protrusion part 12, and the end of the second pluggable unit 2 is also provided with an error-proof concave part 22. Specifically, two terminal pins 11 and two terminal sockets 21 can be operatively connected in a corresponding manner. For example, a conductive connection of the positive and negative poles is formed. The other end of the two terminal pins 11 can be respectively connected with the positive or negative wires (not shown in the figure), and the other end of the two terminal sockets 21 can be respectively connected with the positive or negative wires (not shown in the figure). In some embodiments, the end of the first pluggable unit 1 can also be provided with two first through-hole 13, and the terminal pin 11 is set in the first through-hole 13. The end of the second pluggable unit 2 can also be provided with two second through-hole 23, and the terminal socket 21 is set in the second through-hole 23. The first through-hole 13 and the second through-hole 23 can be operatively connected in a corresponding manner, so that the terminal pin and socket can be isolated from the external environment. The positive or negative wires (not shown in the figure) are respectively connected to the two terminal pins 11 through the two first through-hole 13, the positive or negative wires (not shown in the figure) are respectively connected to two terminal sockets 21 through two second through-holes 23. The error-proof concave part 22 and the error-proof protrusion part 12 can be operatively connected in a corresponding manner to prevent incorrect insertion of the first pluggable unit 1 and the second pluggable unit 2. The error-proof protrusion part 12 is a uniaxially symmetric outline on the plane intersecting with the insertion direction, such as the T-outline in FIG. 1, to prevent abnormal insertion when the positive and negative connections are reversed, the error-proof protrusion part 12 and the error-proof concave part 22 can be clearance fit to prevent the error-proof protrusion part 12 and the error-proof concave part 22 from being inserted too tightly and not easily separated. As shown in FIG. 4, the end of the first pluggable unit 1 is provided with a first pluggable unit groove 14. As shown in FIG. 5, the end of the second pluggable unit 2 is provided with a second pluggable unit groove 24. Specifically, on the plane intersecting with the insertion direction, the inner wall outline of the first pluggable unit groove 14 is the same as the outer wall outline of bottom part of the error-proof protrusion part 12, so that the error-proof protrusion part 12 can be inserted into the first pluggable unit groove 14 to be fixed in the groove. The inner wall outline of the second pluggable unit groove 24 is approximately the same as the outer wall contour of the error-proof concave part 22, so that the error-proof concave part 22 can be inserted into the second pluggable unit groove 24 to be fixed in the groove. The inner wall outline of the error-proof concave part 22 is roughly the same as the outer wall outline of the error-proof protrusion part 12, so that the error-proof protrusion part 12 can be inserted into the error-proof concave part 22 and cannot be rotated. The error-proof protrusion part 12 and the first pluggable unit groove 14 can be detachable connected in an interference fit manner to ensure that the error-proof protrusion part 12 is not easily loosened, and the error-proof concave part 22 and the second pluggable unit groove 24 can also be detachable connected in an interference fit manner to ensure that the error-proof concave part 22 is not easily loosened. However, it can be understood that the number of terminal pins 11 and terminal sockets 21, and corresponding first through-holes 13 and second through-holes 23, can be either two or more or any other number.

Different levels of aircrafts have different battery power levels. In order to connect the corresponding batteries in series, it can replace the error-proof heads of different battery connectors (i.e., the error-proof protrusion part 12 and the error-proof concave part 22) to ensure error proofing. That is, for different product models, it can replace the error-proof protrusion part 12 and the error-proof concave part 22 corresponding to the products to achieve the error proofing effect of connectors of different products. However, it can be understood that, the error-proof protrusion part 12 corresponding to the product and the part connecting to the error-proof concave part 22 and the groove (the first pluggable unit groove 14 or the second pluggable unit groove 24) should be designed to be consistent, so that the error-proof protrusion part 12 and the error-proof concave part 22 can be inserted into the corresponding groove. In addition, the error-proof protrusion part 12 is not limited to be installed on the first pluggable unit 1, and the error-proof concave part 22 is not limited to be installed on the second pluggable unit 2.

The embodiments of the invention can be error-proofed by replacing the error-proof heads of different connectors (i.e., error-proof protrusion part 12 and error-proof concave part 22). The same first pluggable unit 1 and second pluggable unit 2 (excluding error-proof head) can be used to perform error proofing of connectors in combination with the corresponding error-proof heads (i.e., error-proof protrusion part 12 and error-proof concave part 22). For different products, it is not necessary to have different tooling, so that the tooling cost is greatly reduced.

In some embodiments, the first pluggable unit groove 14 or the second pluggable unit groove 24 is an equilateral polygon on the plane intersecting with the insertion direction. For example, it is an equilateral pentagon. At the same time, the outer wall outline of bottom part of the error-proof protrusion part 12 and the outer wall outline of bottom part of the error-proof concave part 22 are also equilateral pentagons matching with the groove. Specifically, the circumferential angle corresponding to each line of the equilateral pentagon is 72 degrees, and the error-proof protrusion part 12 or the error-proof concave part 22 can rotate every 72 degrees, which can be five series plugs to prevent incorrect insertion. By analogy, an equilateral hexagon can be used to be six series plugs to prevent incorrect insertion. However, it can be understood that the first pluggable unit groove 14 or the second pluggable unit groove 24 can also be of other outlines.

In some embodiments, as shown in FIGS. 4 and 5, the outlines of the two first through-holes 13 on the plane intersecting with the insertion direction are respectively circular and square, and the corresponding outlines of the two second through-holes 23 on the plane intersecting with the insertion direction are also circular and square. And the corresponding contours of the first pluggable unit 1 and the second pluggable unit 2 are also circular and square, respectively. This setting can also play a role in error proofing.

Figure 3:
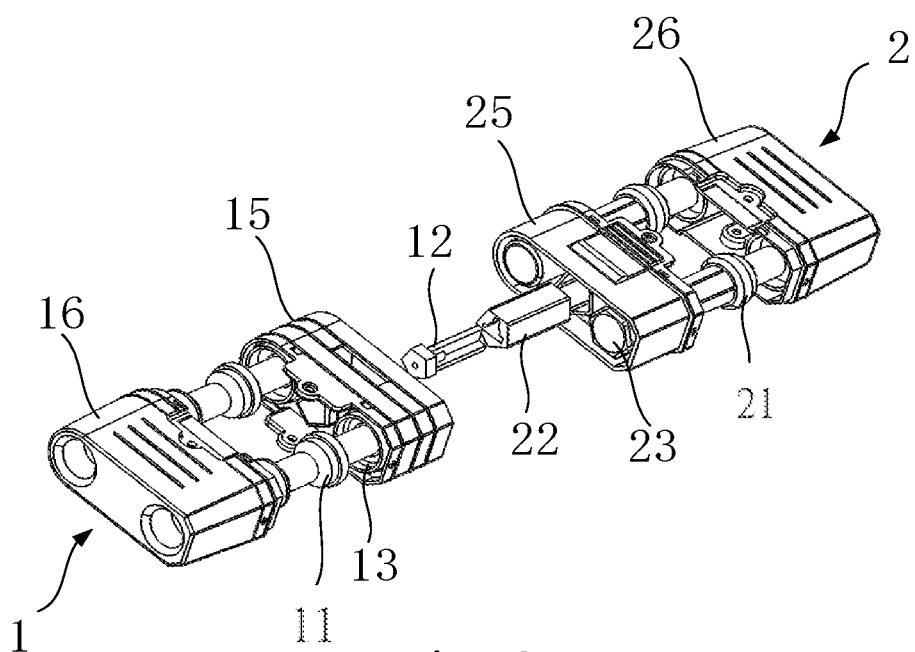
FIG. 3 shows an exploded structure diagram of the first pluggable unit and the second pluggable unit of the connector provided by the embodiment of the present invention.

In some embodiments, as shown in FIG. 3, the first pluggable unit 1 comprises a plug upper housing 15 and a plug lower housing 16, and the second pluggable unit 2 comprises a socket upper housing 25 and a socket lower housing 26; The plug upper housing 15 and the plug lower housing 16 can be detachably connected with each other, the socket upper housing 25 and the socket lower housing 26 can be detachably connected, the terminal pin 11 is set between the plug upper housing 15 and the plug lower housing 16, and the terminal socket 21 is set between the socket upper housing 25 and the socket lower housing 26. Both the first pluggable unit 1 and the second pluggable unit 2 are designed as detachable structures, which facilitate the replacement of terminals to meet the aircraft's requirements for connector weight under different working conditions of large and small current. The plug upper housing 15 and the plug lower housing 16 can be connected by pressing the lock catch to make the plug anti loose and easy to pull out, and can also be connected by fasteners such as screws. Similarly, the socket upper housing 25 and the socket lower housing 26 can be connected by pressing the lock catch or by fasteners such as screws, which are not specifically limited here.

In some embodiments, the surface of the plug is provided with an anti-skid groove, which is convenient for holding the plug for pulling. In addition, positive and negative signs can be designed on the surface of the plug to facilitate prompt users.

The second embodiment of the present invention relates to an aircraft. The aircraft in this embodiment comprises the above connectors. The connectors in this embodiment perform error proofing by replacing the error-proof heads of different connectors (i.e., error-proof protrusion part 12 and error-proof concave part 22). The same first pluggable unit 1 and second pluggable unit 2 (excluding error-proof head) can be used to perform error proofing of connectors in combination with the corresponding error-proof heads (i.e., error-proof protrusion part 12 and error-proof concave part 22). For different products, it is not necessary to have different tooling, so that the tooling cost is greatly reduced.

The above embodiments are merely illustrative of the principles of the present invention and its effects, which is not intended to limit the invention. Any person skilled in the art can modify or alter the above embodiments without departing from the purpose and the scope of the present invention. Accordingly, all equivalent modifications or alterations made by persons having ordinary knowledge in the art, without departing from the purpose and technical ideas disclosed in the present invention, shall still be covered by the claims of the present invention.

What is claimed is:

1. A connector, which is characterized in that the connector comprises:
    a first pluggable unit (1) and a second pluggable unit (2);
    wherein an end of the first pluggable unit (1) is provided with several terminal pins (11);
    wherein an end of the second pluggable unit (2) is provided with several terminal sockets (21), and the terminal pins (11) and the terminal sockets (21) can be operatively connected in a corresponding manner;
    wherein the end of the first pluggable unit (1) and the end of the second pluggable unit (2) are also respectively provided with an error-proof protrusion part (12) and an error-proof concave part (22), the error-proof protrusion part (12) and the error-proof concave part (22) are operatively connected in a corresponding manner, the end of the first pluggable unit (1) is provided with a first pluggable unit groove (14), and the error-proof protrusion part (12) is detachably set in the first pluggable unit groove (14), the end of the second pluggable unit (2) is provided with a second pluggable unit groove (24), and the error-proof concave part (22) is detachably set in the second pluggable unit groove (24)
    wherein the first pluggable unit (1) comprises a plug upper housing (15) and a plug lower housing (16), and the second pluggable unit (2) comprises a socket upper housing (25) and a socket lower housing (26); wherein the plug upper housing (15) and the plug lower housing (16) are detachably connected with each other, the socket upper housing (25) and the socket lower housing (26) are detachably connected, the terminal pin (11) is set between the plug upper housing (15) and the plug lower housing (16), and the terminal socket (21) is set between the socket upper housing (25) and the socket lower housing (26).

2. The connector according to claim 1, which is characterized in that the error-proof protrusion part (12) is a uniaxially symmetrical outline on the plane intersecting with the direction of insertion.

3. The connector according to claim 1, which is characterized in that the first pluggable unit groove (14) and the second pluggable unit groove (24) are equilateral polygons on the plane intersecting with the insertion direction, and the error-proof protrusion part (12) and the error-proof concave part (22) are configured to be selectively inserted into the first pluggable unit groove (14) and the second pluggable unit groove (24) according to the angle of the equilateral polygons.

4. The connector according to claim 1, which is characterized in that the end of the first pluggable unit (1) is provided with a number of first through holes (13), each of the first through-holes (13) is provided with the terminal pin (11), the end of the second pluggable unit (2) is provided with a number of second through-holes (23), each of the second-through-holes (23) is provided with the terminal socket (21), and the terminal pin (11) in the first through-holes (13) and the terminal socket (21) in the second through-holes (23) are operatively connected in a corresponding manner.

5. The connector according to claim 1, which is characterized in that the error-proof concave part (22) comprises an inner wall and an outer wall; on the plane intersecting with the insertion direction, the outer wall has the same outline as the second pluggable unit groove (24), and the inner wall has the same outline as the outer wall of the error-proof protrusion part (12).

6. The connector according to claim 1, which is characterized in that the first pluggable unit groove (14) and the second pluggable unit groove (24) are equilateral pentagons on the plane intersecting with the insertion direction.

7. The connector according to claim 1 which is characterized in that the first pluggable unit (1) and the second pluggable unit (2) are asymmetric with respect to the insertion direction.

8. The connector according to claim 1, which is characterized in that the outlines of the first through-holes (13) on the plane intersecting with the insertion direction are different, and the outlines of the second through-holes (23) on the plane intersecting with the insertion direction are different.

9. An aircraft, which is characterized in that it includes the connector described in claim 1.

10. An aircraft, which is characterized in that it includes the connector described in claim 2.

11. An aircraft, which is characterized in that it includes the connector described in claim 3.

12. An aircraft, which is characterized in that it includes the connector described in claim 4.

13. An aircraft, which is characterized in that it includes the connector described in claim 5.

14. An aircraft, which is characterized in that it includes the connector described in claim 6.

15. An aircraft, which is characterized in that it includes the connector described in claim 7.

16. An aircraft, which is characterized in that it includes the connector described in claim 8.

* * * * *